(12) United States Patent
Hoshi et al.

(10) Patent No.: US 8,810,993 B2
(45) Date of Patent: *Aug. 19, 2014

(54) LAMINATED CAPACITOR

(71) Applicant: Taiyo Yuden Co., Ltd., Tokyo (JP)

(72) Inventors: Yuji Hoshi, Takasaki (JP); Masataka Watabe, Takasaki (JP); Motoki Kobayashi, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,841

(22) Filed: Sep. 9, 2013

(65) Prior Publication Data

US 2014/0016241 A1 Jan. 16, 2014

Related U.S. Application Data

(63) Continuation of application No. 13/442,673, filed on Apr. 9, 2012, now Pat. No. 8,564,930.

(30) Foreign Application Priority Data

Apr. 13, 2011 (JP) ................... 2011-089023

(51) Int. Cl.
*H01G 4/30* (2006.01)
*H01G 4/005* (2006.01)
*H01G 4/06* (2006.01)

(52) U.S. Cl.
CPC . *H01G 4/30* (2013.01); *H01G 4/005* (2013.01)
USPC .......................... 361/301.4; 361/311; 361/303

(58) Field of Classification Search
CPC .......... H01G 4/005; H01G 4/012; H01G 4/30
USPC ................. 361/301.4, 303, 305, 311
See application file for complete search history.

(56) References Cited

U.S. PATENT DOCUMENTS

| 5,978,204 | A | 11/1999 | Stevenson |
| 7,688,567 | B2 | 3/2010 | Aoki |

(Continued)

FOREIGN PATENT DOCUMENTS

| JP | S60-201608 A | 10/1985 |
| JP | S60-254608 A | 12/1985 |

(Continued)

OTHER PUBLICATIONS

Notification of Reasons for Refusal issued by the Japanese Patent Office, mailed Mar. 15, 2013, for Japanese counterpart application No. 2011-089023.

(Continued)

*Primary Examiner* — Eric Thomas
(74) *Attorney, Agent, or Firm* — Law Office of Katsuhiro Arai

(57) ABSTRACT

In a laminated capacitor, one additional first internal electrode layer, which has its edge connected to the first external electrode as do the first internal electrode layers, is provided to one of the five first internal electrode layers so as to face one another via the second dielectric layer having a thickness smaller than the thickness of the first dielectric layer and not contributing to the formation of capacity, and one additional second internal electrode layer, which has its edge connected to the second external electrode as do the second internal electrode layers, is provided to one of the five second internal electrode layers so as to face one another via the third dielectric layer having a thickness smaller than the thickness of the first dielectric layer and not contributing to the formation of capacity.

5 Claims, 5 Drawing Sheets

(56) References Cited

U.S. PATENT DOCUMENTS

| | | | |
|---|---|---|---|
| 7,828,033 | B2 | 11/2010 | Aoki |
| 8,564,930 | B2 * | 10/2013 | Hoshi et al. .................. 361/303 |
| 2005/0117274 | A1 | 6/2005 | Miyauchi et al. |

FOREIGN PATENT DOCUMENTS

| | | |
|---|---|---|
| JP | H07-335473 A | 12/1995 |
| JP | H08-181032 A | 7/1996 |
| JP | H08-316086 A | 11/1996 |
| JP | H10-270281 A | 10/1998 |
| JP | 2005-108890 A | 4/2005 |
| JP | 2005-251940 A | 9/2005 |
| JP | 2007-043001 A | 2/2007 |
| JP | 2009-224569 A | 10/2009 |
| KR | 10-2007-0017064 A | 2/2007 |

OTHER PUBLICATIONS

Korean Office Action issued by the Korean Patent Office, mailed Jul. 17, 2013, for Korean counterpart application No. 10-2012-0012277.
Notice of Reasons for Refusal issued by Japanese Patent Office, mailed Nov. 13, 2013, for Japanese counterpart application No. 2013-097488.

* cited by examiner

LAMINATED CAPACITOR

CROSS-REFERENCE TO RELATED APPLICATIONS

This application is a continuation of U.S. patent application Ser. No. 13/442,673, filed Apr. 9, 2012, now U.S. Pat. No. 8,564,930, which claims priority to Japanese Patent Application No. 2011-089023, filed Apr. 13, 2011, each disclosure of which is incorporated herein by reference in its entirety.

BACKGROUND

1. Field of the Invention

The present invention relates to a laminated capacitor.

2. Description of the Related Art

Laminated capacitors of small size such as 1608 (1.6 mm×0.8 mm), 1005 (1.0 mm×0.5 mm) and 0603 (0.6 mm×0.3 mm) are inferior to large laminated capacitors in terms of bending strength, and therefore more vulnerable to cracks and breaking due to forces applied to the capacitor body when the capacitor body is installed on a circuit board, after it has been mounted, and in other situations. Here, "bending strength" represents the value measured in a test method conducted by supporting the external electrodes of the laminated capacitor and pushing the lengthwise center of the laminated capacitor using a pressure jig, where, specifically, the load that causes the capacitor to break is indicated in gf, N, Pa or other units.

To improve the bending strength of a small laminated capacitor, a reinforcement layer can be provided inside the capacitor body. There are two approaches regarding how to provide this reinforcement layer. One is to add a metal layer, which is different from an internal electrode layer, as a reinforcement layer, while the other is to use an internal electrode layer as a reinforcement layer.

It should be noted that structures that can be utilized according to the former approach are disclosed in Patent Literatures 2 and 3 as mentioned below, while structures that can be utilized according to the latter approach are disclosed in Patent Literatures 1, 4 and 5 as mentioned below, although these structures are not intended to improve the bending strength.

The structures disclosed in Patent Literatures 2 and 3 have a metal layer added to the top and bottom margins (where there is no internal electrode layer) of a capacitor body. Since the added metal layers are not connected to external electrodes, the bending strength does not improve much.

The structure disclosed in Patent Literature 4 has two adjacent internal electrode layers in a capacitor body connected to the same external electrode. This structure can improve the bending strength more than can the structures disclosed in Patent Literatures 2 and 3, but because the two internal electrode layers are provided only on one external electrode side, the mechanical strength of the other external electrode side of the capacitor body becomes lower than the mechanical strength on the one external electrode side. Also, the thickness of the dielectric layer present between the two internal electrode layers connected to the same external electrode is equal to or greater than the thickness of the dielectric layer present between the two internal electrode layers connected to different external electrodes, which increases the height dimension of the laminated capacitor or decreases the number of internal conductive layers contributing to the formation of capacity if the aforementioned increase in height dimension is to be avoided, and the overall capacity of the laminated capacitor will drop.

The structures disclosed in Patent Literatures 1 and 5 have an additional internal electrode layer connected to one external electrode in such a way as to face the top internal electrode layer among the internal electrode layers connected to the one external electrode, as well as an additional internal electrode layer connected to the other external electrode in such a way as to face the bottom internal electrode layer among the internal electrode layers connected to the other external electrode. These structures can improve the bending strength more than can the structure disclosed in Patent Literature 4, but because the thicknesses of the dielectric layers (dielectric layers not contributing to the formation of capacity) each present between the additional internal electrode layer and the internal electrode layer facing the additional internal electrode layer are the same as the thickness of the dielectric layer (dielectric layer contributing to the formation of capacity) present between the two internal electrode layers connected to the different external electrodes, the height dimension of the laminated capacitor increases or the number of internal conductive layers contributing to the formation of capacity decreases if the aforementioned increase in height dimension is to be avoided, and the overall capacity of the laminated capacitor will drop.

Any discussion of problems and solutions involved in the related art has been included in this disclosure solely for the purposes of providing a context for the present invention, and should not be taken as an admission that any or all of the discussion was known at the time the invention was made.

PATENT LITERATURES

[Patent Literatures 1] Japanese Patent Laid-open No. Hei 07-335473

[Patent Literatures 2] Japanese Patent Laid-open No. Hei 08-181032

[Patent Literatures 3] Japanese Patent Laid-open No. Hei 08-316086

[Patent Literatures 4] Japanese Patent Laid-open No. Hei 10-270281

[Patent Literatures 5] Japanese Patent Laid-open No. 2009-224569

SUMMARY

An object of the present invention is to provide a laminated capacitor capable of improving bending strength while suppressing an increase in height dimension.

To achieve the aforementioned object, the present invention provides a laminated capacitor characterized in that:

a plurality of first internal electrode layers used as one polarity and a plurality of second internal electrode layers used as the other polarity are facing one another via a first dielectric layer contributing to the formation of capacity and also arranged alternately via the first dielectric layer; and the edges of the plurality of first internal electrode layers are connected to a first external electrode used as one polarity, while the edges of the plurality of second internal electrode layers are connected to a second external electrode used as the other electrode;

wherein at least one additional first internal electrode layer, which has its edge connected to the first external electrode as do the first internal electrode layers, is provided to at least one of the plurality of first internal electrode layers so as to face one another via a second dielectric layer having a thickness smaller than the thickness of the first dielectric layer and not contributing to the formation of capacity; and wherein at least one additional second internal electrode layer, which has its edge connected to the second external electrode as do the second internal electrode layers, is provided to at least one of the plurality of second internal electrode layers so as to face one another via a third dielectric layer having a thickness smaller than the thickness of the first dielectric layer and not contributing to the formation of capacity.

According to the present invention, at least one additional first internal electrode layer, which has its edge connected to the first external electrode as do the first internal electrode layers, is provided to at least one of the plurality of first internal electrode layers so as to face one another via a second dielectric layer having a thickness smaller than the thickness of the first dielectric layer and not contributing to the formation of capacity, and at least one additional second internal electrode layer, which has its edge connected to the second external electrode as do the second internal electrode layers, is provided to at least one of the plurality of second internal electrode layers so as to face one another via a third dielectric layer having a thickness smaller than the thickness of the first dielectric layer and not contributing to the formation of capacity.

In other words, the structure is such that the at least one additional first internal electrode layer is used as a reinforcement layer, while the at least one additional second internal electrode layer is used as a reinforcement layer, and therefore the presence of these reinforcement layers allows for improvement of the bending strength of the laminated capacitor.

Also, the structure is such that the at least one additional first internal electrode layer is connected to the first external electrode, while the at least one additional second internal electrode layer is connected to the second external electrode, and therefore the mechanical strength on the first external electrode side of the capacitor body is balanced with the mechanical strength on the second external electrode side, which allows for improvement of the bending strength of the laminated capacitor in a more precise fashion.

Furthermore, the thickness of the second dielectric layer (dielectric layer not contributing to the formation of capacity) present between the at least one additional first internal electrode layer and the first internal electrode layer facing the additional first internal electrode layer, and thickness of the third dielectric layer (dielectric layer not contributing to the formation of capacity) present between the at least one additional second internal electrode layer and the second internal electrode layer facing the additional second internal electrode layer, are smaller than the thickness of the first internal dielectric layer (dielectric layer contributing to the formation of capacity) present between the first internal conductive layer and second conductive layer, and this helps suppress the increase in the height dimension of the laminated capacitor as much as possible.

The aforementioned object and other objects, constitution/characteristics and operation/effects of the present invention are made clear by the following explanations and attached drawings.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

Figure 1:
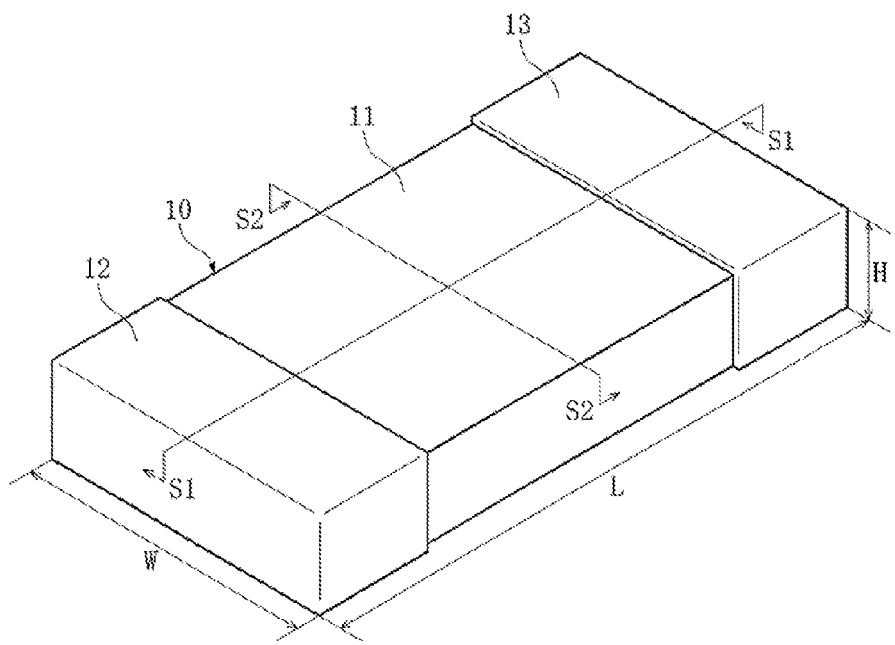
FIG. 1 is an external perspective view of a laminated capacitor to which the present invention is applied (first embodiment).
Figure 2:
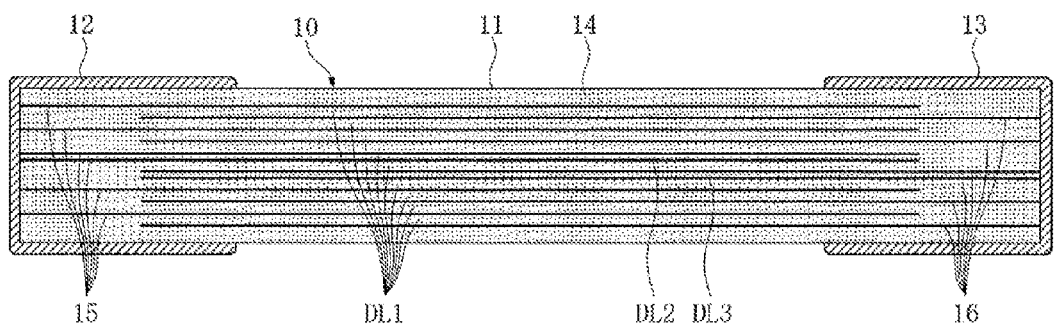
FIG. 2 is an enlarged view of FIG. 1, showing the section cut along line S1-S1.
Figure 3:
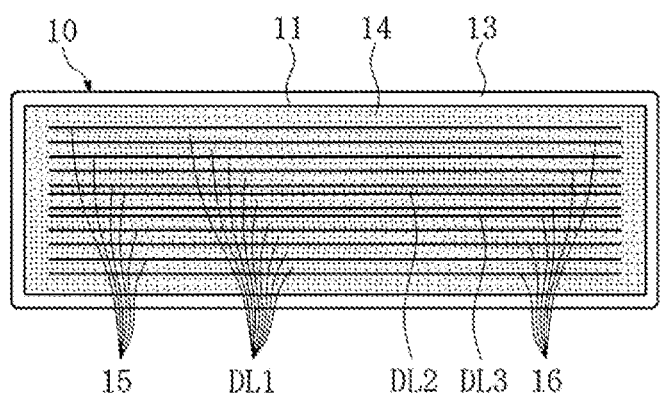
FIG. 3 is an enlarged view of FIG. 1, showing the section cut along line S2-S2.
Figure 4:
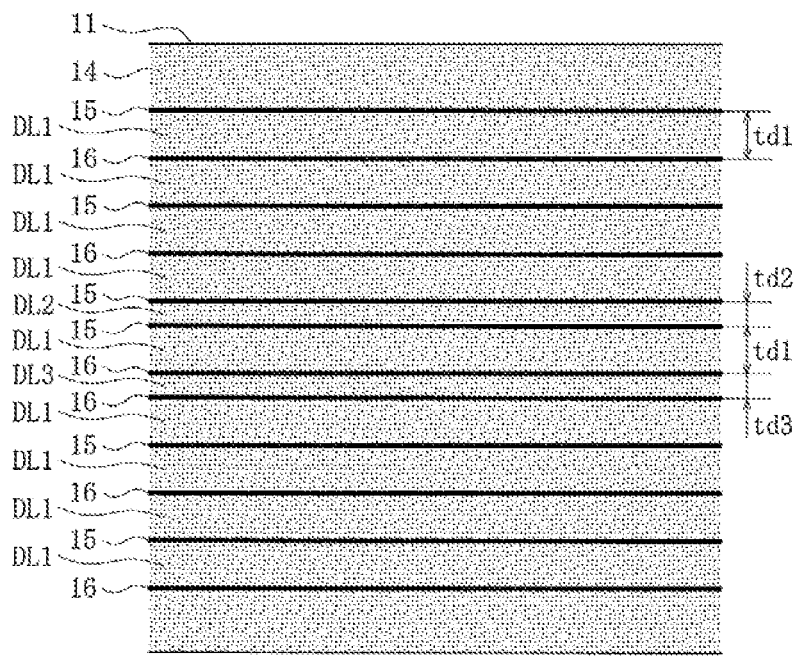
FIG. 4 is a partially enlarged view of FIG. 2.

DESCRIPTION OF THE SYMBOLS 10, 10', 20, 20', 30, 30'—Laminated capacitor
11—Capacitor body
12—First external electrode
13—Second external electrode
14—Dielectric part
15—First internal electrode layer (including the additional first internal electrode layer)
16—Second internal electrode layer (including the additional second internal electrode layer)
DL1—First dielectric layer
DL2—Second dielectric layer
DL3—Third dielectric layer

DETAILED DESCRIPTION

The present invention is explained with reference to typical embodiments which are not intended to limit the present invention.

First Embodiment

FIGS. 1 to 4 show a laminated capacitor 10 to which the present invention is applied (first embodiment).

<Structure of Laminated Capacitor 10>

First, the structure of the laminated capacitor 10 is explained. In the following explanations, left, right, front, back, top and bottom of the drawing of FIG. 2 refer to front, rear, left, right, top and bottom of the capacitor, respectively, and the same applies to the corresponding directions of other figures, for the purpose of convenience of explanation.

The laminated capacitor 10 forms a rough rectangular solid shape having the relationships of length dimension L>width dimension W>height dimension H, where the specific length dimension L is 1.0 mm, width dimension W is 0.5 mm, and height dimension H is 0.15 mm.

The laminated capacitor 10 has a capacitor body 11 that forms a rough rectangular solid body having the same dimensional relationships as mentioned above, a first external electrode 12 that continuously covers the front face, and front parts of the left and right faces and top and bottom faces, of the capacitor body 11, and a second external electrode 13 that continuously covers the rear face, and rear parts of the left and right faces and top and bottom faces, of the capacitor body 11. The first external electrode 12 is used as one polarity, while the second external electrode 13 is used as the other polarity.

The capacitor body 11 is constituted by a dielectric part 14 made of ceramics, a total of six first internal electrode layers 15 that are made of metal and provided in the dielectric part 14, and a total of six second internal electrode layers 16 that are made of the same material as the first internal electrode layers 15 and provided in the dielectric part 14. The specific name of the material of the dielectric part 14 is barium titanate, while the specific name of the material of the first internal electrode layers 15 and second internal electrode layers 16 is nickel.

It should be noted that the number of first internal electrode layers 15 and the number of second internal electrode layers 16 are greater than 6 in actuality, but the following explains the capacitor body 11 by assuming that the number of first internal electrode layers 15 and number of second internal electrode layers 16 are both 6, for the purpose of convenience of illustration.

Each first internal electrode layer 15 forms a rectangle whose length dimension and width dimension are smaller than the length dimension and width dimension of the capacitor body 11, while each second internal electrode layer 16 forms a rectangle whose length dimension and width dimension are roughly the same as those of the first internal electrode layer 15. The thickness of each first internal electrode layer 15 is the same as the thickness of each second internal electrode layer 16, and this thickness is 0.5 to 3.0 µm, for example.

The front edge of each first internal electrode layer 15 is electrically connected to the first external electrode 12, while the rear edge of each second internal electrode layer 16 is electrically connected to the second external electrode 13. In other words, each first internal electrode layer 15 is used as one polarity, while each second internal electrode layer 16 is used as the other polarity.

Five first internal electrode layers 15 among the total of six first internal electrode layers 15, and five second internal electrode layers 16 among the total of six second internal electrode layers 16, are basically facing one another via a first dielectric layer DL1 contributing to the formation of capacity and also arranged alternately via the first dielectric layer DL1. The thickness td1 of each first dielectric layer DL1 is 2.0 to 6.0 µm, for example.

Also, one additional first internal electrode layer 15 is provided in a manner facing the third first internal electrode layer 15 from the top via a second dielectric layer DL2 not contributing to the formation of capacity. Additionally, one additional second internal electrode layer 16 is provided in a manner facing the third second internal electrode layer 16 from the top via a third dielectric layer DL3 not contributing to the formation of capacity. In other words, one additional first internal electrode layer 15 and one additional second internal electrode layer 16 are provided for the first internal electrode layer 15 and second internal electrode layer 16, respectively, that are present side by side at the very center of the capacitor body 11.

The thickness td2 of the second dielectric layer DL2 and thickness td3 of the third dielectric layer DL3 are roughly the same and smaller than the thickness td1 of the first dielectric layer DL1. Preferably the relationship of the thickness td2 of the second dielectric layer DL2, thickness td3 of the third dielectric layer DL3 and thickness td1 of the first dielectric layer DL1 should satisfy td2≅td3<⅔×td1. The thickness td2 of the second dielectric layer DL2 and thickness td3 of the third dielectric layer DL3 are 0.5 to 3.0 µm, for example, and closer to the thickness of each first internal electrode layer 15 and thickness of each second internal electrode layer 16 than to the thickness td1 of the first dielectric layer DL1.

It should be noted that because the thickness td2 of the second dielectric layer DL2 and thickness td3 of the third dielectric layer DL3 are smaller than the thickness td1 of the first dielectric layer DL1, in the sintering process of heat treatment in the manufacturing method explained later, the baking of the second dielectric layer DL2 sandwiched between two first internal electrode layers 15 and the baking of the third dielectric layer DL3 sandwiched between two second internal electrode layers 16 progress more quickly than the baking of the thickness td1 of the first dielectric layer DL1 present between the first internal electrode layer 15 and second internal electrode layer 16, and from this difference in baking speeds the strength of the second dielectric layer DL2 and strength of the third dielectric layer DL3 are considered higher than the strength of the first dielectric layer DL1.

The first external electrode 12 and second external electrode 13, which are not shown, have a multi-layer structure comprising a base film and a surface film covering the base film. The specific name of the material of the base film is nickel and its thickness is 1.0 to 3.0 µm, for example, while the specific name of the material of the surface film is tin and its thickness is 0.5 to 1.5 µm, for example.

The capacity of the laminated capacitor 10 is formed between the first internal conductive layer 15 and second conductive layer 16 that are facing each other via the first dielectric layer DL1 contributing to the formation of capacity, among the total of six first internal electrode layers 15 and total of six second internal electrode layers 16.

<Method of Manufacturing Laminated Capacitor 10>

Next, the method of manufacturing the laminated capacitor 10 is explained. Take note that the manufacturing method explained here is only an example and it goes without saying that the laminated capacitor 10 can also be manufactured by changing the composition of the dielectric slurry mentioned below or composition of the conductive paste mentioned below, or by simultaneously applying heat treatment to the unsintered chip mentioned below and base film paste mentioned below.

Prior to manufacturing, a dielectric slurry containing barium titanate powder and polyvinyl butyral (binder), ethanol and water (solvent), and phosphate ester (dispersant), all at a specified weight ratio, is prepared. Also, a conductive paste containing nickel powder, barium titanate powder and polyvinyl butyral (binder), ethanol (solvent), and phosphate ester (dispersant), all at a specified weight ratio, is also prepared.

Next, a doctor blade or other coating machine is used to apply the dielectric slurry to a specified thickness onto a base film made of PET, etc., and then the slurry is dried to produce a first dielectric sheet, and the same method is followed to produce a second dielectric sheet which is thinner than the first dielectric sheet.

Next, a screen printer or other printer is used to print the conductive paste onto the first dielectric sheet at a specified thickness, shape and layout, and then the paste is dried to produce a first laminated sheet for the first internal electrode layer 15, and the same method is followed to produce a second laminated sheet for the second internal electrode layer 16.

Also, a screen printer or other printer is used to print the conductive paste onto the second dielectric sheet at a specified thickness, shape and layout, and then the paste is dried to produce a third laminated sheet for the additional first internal electrode layer 15, and the same method is followed to produce a fourth laminated sheet for the additional second internal electrode layer 16.

Next, a specified number of first dielectric sheets are stacked, a second laminated sheet is stacked on top, a first laminated sheet is stacked on top, a second laminated sheet is stacked on top, a first laminated sheet is stacked on top, a second laminated sheet is stacked on top, a fourth laminated sheet is stacked on top, a first laminated sheet is stacked on top, a third laminated sheet is stacked on top, a second laminated sheet is stacked on top, a first laminated sheet is stacked on top, a second laminated sheet is stacked on top, a first laminated sheet is stacked on top, and a specified number of first dielectric sheets are stacked on top, after which a hydrostatic press or other press machine is used to apply pressure to the entire stack in order to pressure-bond the sheets together to produce a sheet laminate.

Next, a dicing machine or other cutting machine is used to cut the sheet laminate to a size corresponding to the capacitor body 11, to produce an unsintered chip.

Next, a sintering furnace or other heating apparatus is used to heat-treat a number of unsintered chips all at the same time according to a specified temperature profile. This heat treatment includes the binder removal process and sintering process, and the capacitor body 11 is produced after these processes.

Next, a dipper or other coating apparatus is used to apply the conductive paste onto both of the lengthwise ends of the capacitor body 11 and the paste is dried. Thereafter, a sintering furnace or other heating apparatus is used to heat-treat a number of capacitor bodies 11 coated with the conductive paste, all at the same time according to a specified temperature profile, to produce a base film (nickel film) for the first external electrode 12 and base film (nickel film) for the second external electrode 13.

Next, an electroplating bath or other plating apparatus is used to plate the capacitor bodies 11 on which the base films have been produced, all at the same time, to produce a surface film (tin film) for the first external electrode 12 and surface film (tin film) for the second external electrode 13. Now, the laminated capacitor 10 has been produced.

<Effects of Laminated Capacitor 10>

Next, the effects of the laminated capacitor 10 are explained.

(1) One additional first internal electrode layer 15, which has its edge connected to the first external electrode 12 as do the first internal electrode layers 15, is provided to one of the five first internal electrode layers 15 so as to face one another via the second dielectric layer DL2 having a thickness td2 smaller than the thickness td1 of the first dielectric layer DL1 and not contributing to the formation of capacity, and one additional second internal electrode layer 16, which has its edge connected to the second external electrode 13 as do the second internal electrode layers 16, is provided to one of the five second internal electrode layers 16 so as to face one another via the third dielectric layer DL3 having a thickness td3 smaller than the thickness td1 of the first dielectric layer DL1 and not contributing to the formation of capacity.

In other words, the structure is such that the one additional first internal electrode layer 15 is used as a reinforcement layer, while the one additional second internal electrode layer 16 is used as a reinforcement layer, and therefore the presence of these reinforcement layers allows for improvement of the bending strength of the laminated capacitor 10.

Also, the structure is such that the additional first internal electrode layer 15 is connected to the first external electrode 12, while the additional second internal electrode layer 16 is connected to the second external electrode 13, and therefore the mechanical strength on the first external electrode 12 side of the capacitor body 11 is balanced with the mechanical strength on the second external electrode 13 side, which allows for improvement of the bending strength of the laminated capacitor 10 in a more precise fashion.

Furthermore, the thickness td2 of the second dielectric layer DL2 (dielectric layer not contributing to the formation of capacity) present between the additional first internal electrode layer 15 and the first internal electrode layer 15 facing the additional first internal electrode layer, and thickness td3 of the third dielectric layer DL3 (dielectric layer not contributing to the formation of capacity) present between the additional second internal electrode layer 16 and the second internal electrode layer 16 facing the additional second internal electrode layer, are smaller than the thickness td1 of the first internal dielectric layer DL1 (dielectric layer contributing to the formation of capacity) present between the first internal conductive layer 15 and second conductive layer 16, and this helps suppress the increase in the height dimension H of the laminated capacitor 10 as much as possible.

(2) The strength of the second dielectric layer DL2 (dielectric layer not contributing to the formation of capacity) present between the additional first internal electrode layer 15 and the first internal electrode layer 15 facing the additional first internal electrode layer, and strength of the third dielectric layer DL3 (dielectric layer not contributing to the formation of capacity) present between the additional second internal electrode layer 16 and the second internal electrode layer 16 facing the additional second internal electrode layer, are higher than the strength of the first internal dielectric layer DL1 (dielectric layer contributing to the formation of capacity) present between the first internal conductive layer 15 and second conductive layer 16, and this allows for improvement of the bending strength of the laminated capacitor 10 in a more reliable manner, with the second dielectric layer DL2 and third dielectric layer DL3 assuming the role of reinforcement layers.

<Verification of Bending Strength of Laminated Capacitor 10>

Note that with the laminated capacitor of the size (length dimension L of 1.0 mm, width dimension W of 0.5 mm and height dimension H of 0.15 mm) explained in <Structure of Laminated Capacitor 10> above, the measured bending strength must be 100 gf or more in order to prevent cracks and breaking due to forces applied to the capacitor body when the capacitor body is installed on a circuit board, after it has been mounted, and in other situations, regardless of the total number of internal electrode layers, capacity of the laminated capacitor, and the like.

In light of the aforementioned situation, a prototype of the laminated capacitor 10 was produced based on the number of first internal electrode layers 15 (including the additional first internal electrode layer 15) being 19, the number of second internal electrode layers 16 (including the additional second internal electrode layer 16) being 19, the thickness of each first internal electrode layer 15 and the thickness of each second internal electrode layer 16 being 0.8 μm, the thickness td1 of each first dielectric layer DL1 being 2.3 μm, and the thickness td2 of the second dielectric layer DL2 and thickness td3 of the third dielectric layer DL3 being 0.9 μm, and when the bending strength of this prototype was measured, it was 180 gf.

Another prototype of the laminated capacitor 10 was produced based on the number of first internal electrode layers 15 (including the additional first internal electrode layer 15)

being 19, the number of second internal electrode layers 16 (including the additional second internal electrode layer 16) being 19, the thickness of each first internal electrode layer 15 and the thickness of each second internal electrode layer 16 being 0.8 µm, the thickness td1 of each first dielectric layer DL1 being 2.3 µm, and the thickness td2 of the second dielectric layer DL2 and the thickness td3 of the third dielectric layer DL3 being 1.4 µm, and when the bending strength of this prototype was measured, it was 140 gf.

On the other hand, a prototype of a laminated capacitor for comparison was produced based on the number of first internal electrode layers 15 (no additional first internal electrode layer 15) being 19, the number of second internal electrode layers 16 (no additional second internal electrode layer 16) being 19, the thickness of each first internal electrode layer 15 and the thickness of each second internal electrode layer 16 being 0.8 µm, and the thickness td1 of each first dielectric layer DL1 being 2.3 µm, or specifically a prototype of general structure having no additional first internal electrode layer 15, additional second internal electrode layer 16, second dielectric layer DL2 or third dielectric layer DL3, and when the bending strength of this prototype was measured, it was 95 gf.

<Examples of Structural Variation of Laminated Capacitor 10>

Next, examples of structural variation of the laminated capacitor 10 are explained.

Figure 5:
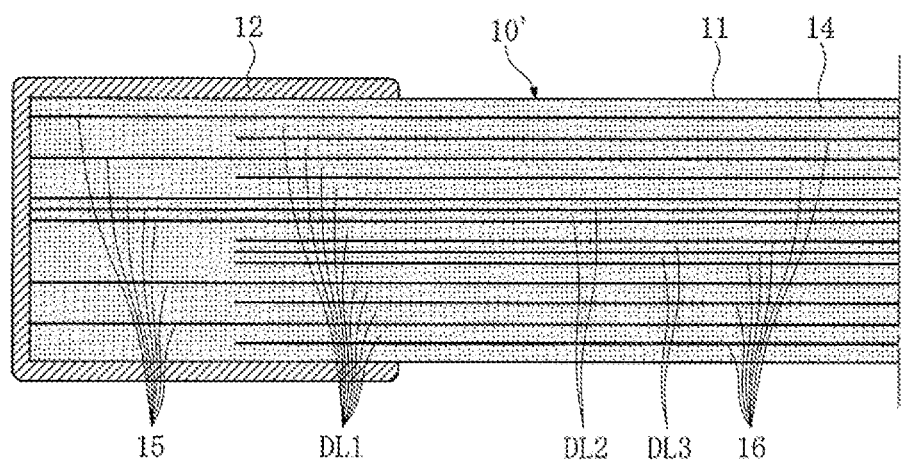
FIG. 5 is a section view corresponding to FIG. 2 (enlarged section view showing one lengthwise half), showing an example of structural variation of the laminated capacitor shown in FIGS. 1 to 4.

(1) FIGS. 1 to 4 show a laminated capacitor 10 having one additional first internal electrode layer 15 and second dielectric layer DL2, as well as one additional second internal electrode layer 16 and third dielectric layer DL3, but the same effects as mentioned above can be achieved with the laminated capacitor 10' shown in FIG. 5 which has two (or three or more) additional first internal electrode layers 15 and second dielectric layers DL2, as well as two (or three or more) additional second internal electrode layers 16 and third dielectric layers DL3.

Increasing the number of additional first internal electrode layers 15 and second dielectric layers DL2 and the number of additional second internal electrode layers 16 and third dielectric layers DL3 improves the bending strength of the laminated capacitor 10' further, but it also increases the height dimension H of the laminated capacitor 10', and therefore, in reality, the number of additional first internal electrode layers 15 and second dielectric layers DL2 and the number of additional second internal electrode layers 16 and third dielectric layers DL3 must be carefully selected, by considering the amount of increase in the height dimension H of the laminated capacitor 10'.

(2) FIGS. 1 to 4 show a laminated capacitor 10 where the number of first internal electrode layers 15 (including the additional first internal electrode layer 15) and the number of second internal electrode layers 16 (including the additional second internal electrode layer 16) are both 6, for the purpose of convenience, but, as stated earlier, the number of first internal electrode layers 15 and the number of second internal electrode layers 16 are actually greater than 6 and the same effects as mentioned above can be achieved when both are greater than 6.

(3) FIGS. 1 to 4 show a laminated capacitor 10 whose length dimension L is 1.0 mm, width dimension W is 0.5 mm and height dimension H is 0.15 mm, but the same effects as mentioned above can be achieved with a laminated capacitor whose length dimension L, width dimension W and height dimension H are other than the aforementioned values, and the same effects as mentioned above can also be achieved with a laminated capacitor having the relationship of (length dimension L)>(width dimension W)=(height dimension H).

(4) FIGS. 1 to 4 show an example of the thickness of each first internal electrode layer 15 and thickness of each second internal electrode layer 16 being 0.5 to 3.0 µm, an example of the thickness td1 of each first dielectric layer DL1 being 2.0 to 6.0 µm, and an example of the thickness td2 of the second dielectric layer DL2 and the thickness td3 of the third dielectric layer DL3 being 0.5 to 3.0 µm, but these values can be changed as deemed appropriate according to the aforementioned number of first internal electrode layers 15 and the number of second internal electrode layers 16, the aforementioned size of the laminated capacitor 10 and the capacity required of the laminated capacitor 10, and so on, and even when they are changed, the same effects as mentioned above can be achieved.

(5) FIGS. 1 to 4 show an example of the material of the dielectric part 14 (including the first dielectric layer DL1, second dielectric layer DL2 and third dielectric layer DL3) being barium titanate, an example of the material of the first internal electrode layer 15 and second internal electrode layer 16 being nickel, an example of the material of the base film for the first external electrode 12 and second external electrode 13 being nickel, and an example of the material of the surface film being tin, but the same effects as mentioned above can be achieved even when the dielectric part 14 is made of a dielectric substance other than barium titanate, when the first internal electrode layer 15 and the second internal electrode layer 16 are made of a metal or alloy other than nickel, when the base film for the first external electrode 12 and the second external electrode 13 is made of a metal or alloy other than nickel, and when the surface film is made of a metal or alloy other than tin.

Second Embodiment

Figure 6:
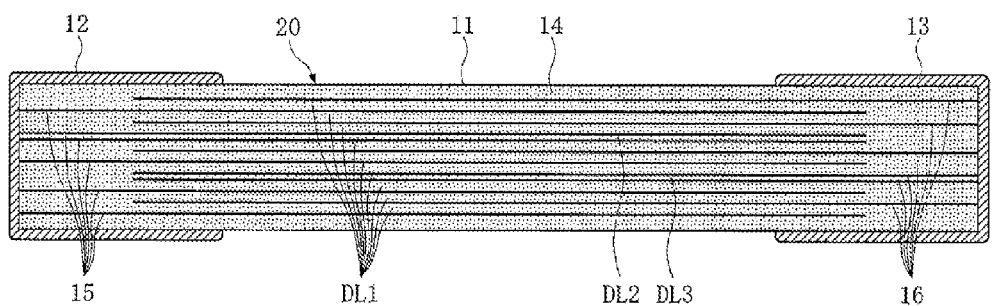
FIG. 6 is a section view corresponding to FIG. 2, showing a laminated capacitor to which the present invention is applied (second embodiment).

FIG. 6 shows a laminated capacitor 20 to which the present invention is applied (second embodiment).

<Structure of Laminated Capacitor 20>

The laminated capacitor 20 is structurally different from the laminated capacitor 10 (first embodiment) in that one additional first internal electrode layer 15 is provided in a manner facing the second first internal electrode layer 15 from the top via the second dielectric layer DL2 not contributing to the formation of capacity, while one additional second internal electrode layer 16 is provided in a manner facing the fourth second internal electrode layer 16 from the top (second from the bottom) via the third dielectric layer DL3 not contributing to the formation of capacity. Other parts of the structure are the same as those of the laminated capacitor 10 (first embodiment) and therefore not explained.

The manufacturing method of this laminated capacitor 20 is the same as that of the laminated capacitor 10 (first embodiment), except that the stacking order of the first through fourth laminated sheets is changed, and therefore not explained. Also, the effects achieved with this laminated capacitor 20 are the same as those achieved with the laminated capacitor 10 (first embodiment) and therefore not explained.

<Examples of Structural Variation of Laminated Capacitor 20>

Next, examples of structural variation of the laminated capacitor 20 are explained.

Figure 7:
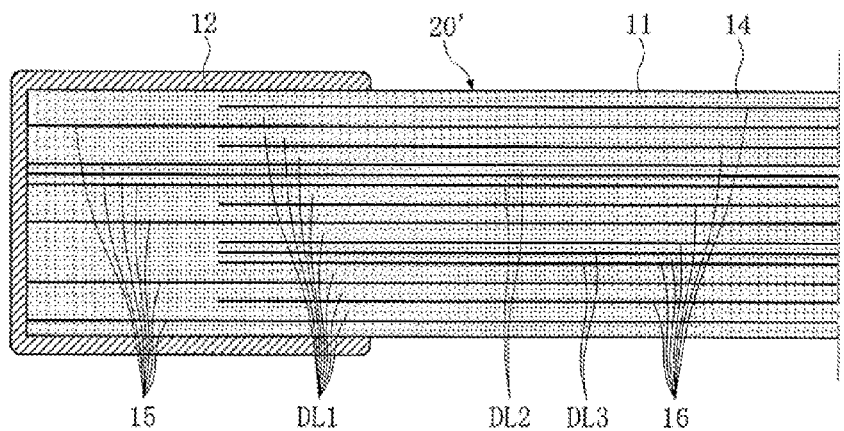
FIG. 7 is a section view corresponding to FIG. 5, showing an example of structural variation of the laminated capacitor shown in FIG. 6.

(1) FIG. 6 shows a laminated capacitor 20 having one additional first internal electrode layer 15 and second dielectric layer DL2, as well as one additional second internal electrode layer 16 and third dielectric layer DL3, but the same effects as mentioned above can be achieved with the laminated capacitor 20' shown in FIG. 7 which has two (or three or more) additional first internal electrode layers 15 and second dielectric layers DL2, as well as two (or three or more) additional second internal electrode layers 16 and third dielectric layers DL3.

Increasing the number of additional first internal electrode layers 15 and second dielectric layers DL2 and the number of additional second internal electrode layers 16 and third dielectric layers DL3 improves the bending strength of the laminated capacitor 20' further, but it also increases the height dimension H of the laminated capacitor 20', and therefore, in reality, the number of additional first internal electrode layers 15 and second dielectric layers DL2 and the number of additional second internal electrode layers 16 and third dielectric layers DL3 must be carefully selected, by considering the amount of increase in the height dimension H of the laminated capacitor 20'.

(2) FIG. 6 shows a laminated capacitor 20 where the number of first internal electrode layers 15 (including the additional first internal electrode layer 15) and the tnumber of second internal electrode layers 16 (including the additional second internal electrode layer 16) are both 6, for the purpose of convenience, but, as stated earlier, the number of first internal electrode layers 15 and the number of second internal electrode layers 16 are actually greater than 6 and the same effects as mentioned above can be achieved when both are greater than 6.

(3) FIG. 6 shows a laminated capacitor 20 whose length dimension L is 1.0 mm, width dimension W is 0.5 mm and height dimension H is 0.15 mm, but the same effects as mentioned above can be achieved with a laminated capacitor whose length dimension L, width dimension W and height dimension H are other than the aforementioned values, and the same effects as mentioned above can also be achieved with a laminated capacitor having the relationship of (length dimension L)>(width dimension W)=(height dimension H).

(4) FIG. 6 shows an example of the thickness of each first internal electrode layer 15 and the thickness of each second internal electrode layer 16 being 0.5 to 3.0 μm, an example of the thickness td1 of each first dielectric layer DL1 being 2.0 to 6.0 μm, and an example of the thickness td2 of the second dielectric layer DL2 and the thickness td3 of the third dielectric layer DL3 being 0.5 to 3.0 μm, but these values can be changed as deemed appropriate according to the aforementioned number of first internal electrode layers 15 and the number of second internal electrode layers 16, the aforementioned size of the laminated capacitor 20 and capacity required of the laminated capacitor 20, and so on, and even when they are changed, the same effects as mentioned above can be achieved.

(5) FIG. 6 shows an example of the material of the dielectric part 14 (including the first dielectric layer DL1, second dielectric layer DL2 and third dielectric layer DL3) being barium titanate, an example of the material of the first internal electrode layer 15 and second internal electrode layer 16 being nickel, an example of the material of the base film for the first external electrode 12 and second external electrode 13 being nickel, and an example of the material of the surface film being tin, but the same effects as mentioned above can be achieved even when the dielectric part 14 is made of a dielectric substance other than barium titanate, when the first internal electrode layer 15 and second internal electrode layer 16 are made of a metal or alloy other than nickel, when the base film for the first external electrode 12 and second external electrode 13 is made of a metal or alloy other than nickel, and when the surface film is made of a metal or alloy other than tin.

Third Embodiment

Figure 8:
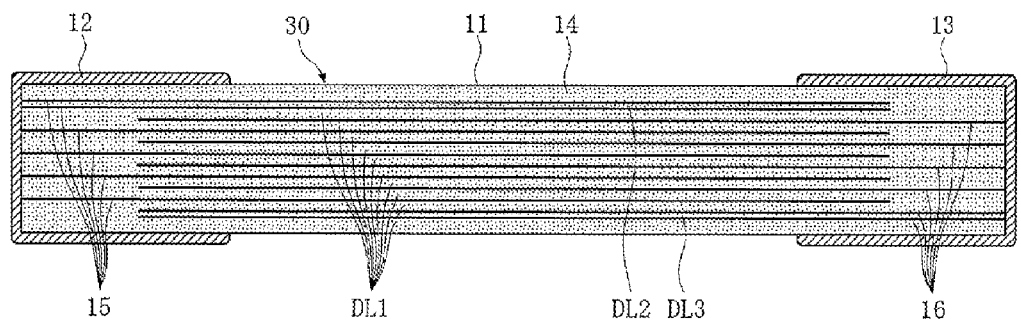
FIG. 8 is a section view corresponding to FIG. 2, showing a laminated capacitor to which the present invention is applied (third embodiment).

FIG. 8 shows a laminated capacitor 30 to which the present invention is applied (third embodiment).

<Structure of Laminated Capacitor 30>

The laminated capacitor 30 is structurally different from the laminated capacitor 10 (first embodiment) in that one additional first internal electrode layer 15 is provided in a manner facing the top (outermost) first internal electrode layer 15 via the second dielectric layer DL2 not contributing to the formation of capacity, while one additional second internal electrode layer 16 is provided in a manner facing the fifth second internal electrode layer 15 from the top (bottom, or outermost) via the third dielectric layer DL3 not contributing to the formation of capacity. Other parts of the structure are the same as those of the laminated capacitor 10 (first embodiment) and therefore not explained.

The manufacturing method of this laminated capacitor 30 is the same as that of the laminated capacitor 10 (first embodiment), except that the stacking order of the first through fourth laminated sheets is changed, and therefore not explained. Also, the effects achieved with this laminated capacitor 30 are the same as those achieved with the laminated capacitor 10 (first embodiment) and therefore not explained.

<Examples of Structural Variation of Laminated Capacitor 30>

Next, examples of structural variation of the laminated capacitor 30 are explained.

Figure 9:
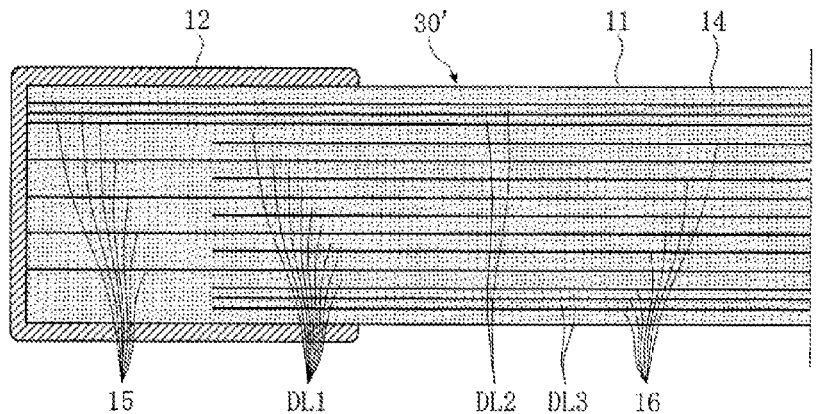
FIG. 9 is a section view corresponding to FIG. 5, showing an example of structural variation of the laminated capacitor shown in FIG. 8.

(1) FIG. 8 shows a laminated capacitor 30 having one additional first internal electrode layer 15 and second dielectric layer DL2, as well as one additional second internal electrode layer 16 and third dielectric layer DL3, but the same effects as mentioned above can be achieved with the laminated capacitor 30' shown in FIG. 9 which has two (or three or more) additional first internal electrode layers 15 and second dielectric layers DL2, as well as two (or three or more) additional second internal electrode layers 16 and third dielectric layers DL3.

Increasing the number of additional first internal electrode layers 15 and second dielectric layers DL2 and the number of additional second internal electrode layers 16 and third dielectric layers DL3 improves the bending strength of the laminated capacitor 30' further, but it also increases the height dimension H of the laminated capacitor 30', and therefore, in reality, the number of additional first internal electrode layers 15 and second dielectric layers DL2 and the number of additional second internal electrode layers 16 and third dielectric layers DL3 must be carefully selected, by considering the amount of increase in the height dimension H of the laminated capacitor 30'.

(2) FIG. 8 shows a laminated capacitor 30 where the number of first internal electrode layers 15 (including the additional first internal electrode layer 15) and the number of second internal electrode layers 16 (including the additional second internal electrode layer 16) are both 6, for the purpose of convenience, but, as stated earlier, the number of first internal electrode layers 15 and the number of second internal electrode layers 16 are actually greater than 6 and the same effects as mentioned above can be achieved when both are greater than 6.

(3) FIG. 8 shows a laminated capacitor 30 whose length dimension L is 1.0 mm, width dimension W is 0.5 mm and height dimension H is 0.15 mm, but the same effects as mentioned above can be achieved with a laminated capacitor whose length dimension L, width dimension W and height dimension H are other than the aforementioned values, and the same effects as mentioned above can also be achieved with a laminated capacitor having the relationship of (length dimension L)>(width dimension W)=(height dimension H).

(4) FIG. 8 shows an example of the thickness of each first internal electrode layer 15 and the thickness of each second internal electrode layer 16 being 0.5 to 3.0 μm, an example of the thickness td1 of each first dielectric layer DL1 being 2.0 to 6.0 μm, and an example of the thickness td2 of the second dielectric layer DL2 and the thickness td3 of the third dielectric layer DL3 being 0.5 to 3.0 μm, but these values can be changed as deemed appropriate according to the aforementioned number of first internal electrode layers 15 and the number of second internal electrode layers 16, the aforementioned size of the laminated capacitor 30 and the capacity required of the laminated capacitor 30, and so on, and even when they are changed, the same effects as mentioned above can be achieved.

(5) FIG. 8 shows an example of the material of the dielectric part 14 (including the first dielectric layer DL1, second dielectric layer DL2 and third dielectric layer DL3) being barium titanate, an example of the material of the first internal electrode layer 15 and second internal electrode layer 16 being nickel, an example of the material of the base film for the first external electrode 12 and second external electrode 13 being nickel, and an example of the material of the surface film being tin, but the same effects as mentioned above can be achieved even when the dielectric part 14 is made of a dielectric substance other than barium titanate, when the first internal electrode layer 15 and second internal electrode layer 16 are made of a metal or alloy other than nickel, when the base film for the first external electrode 12 and second external electrode 13 is made of a metal or alloy other than nickel, and when the surface film is made of a metal or alloy other than tin.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. In this disclosure, any defined meanings do not necessarily exclude ordinary and customary meanings in some embodiments. Also, in this disclosure, "the invention" or "the present invention" refers to one or more of the embodiments or aspects explicitly, necessarily, or inherently disclosed herein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A laminated capacitor comprising:
a plurality of first internal electrode layers used as one polarity and a plurality of second internal electrode layers used as another polarity facing one another via a first dielectric layer contributing to the formation of capacity and also arranged alternately via the first dielectric layer; and
a first external electrode used as one polarity, to which edges of the plurality of first internal electrode layers are connected, and a second external electrode used as another polarity, to which edges of the plurality of second internal electrode layers are connected;
wherein at least one additional first internal electrode layer, which has its edge connected to the first external electrode as do the first internal electrode layers, is provided to only one of the plurality of first internal electrode layers so as to face one another via a second dielectric layer having a thickness smaller than the thickness of the first dielectric layer and not contributing to the formation of capacity;
wherein at least one additional second internal electrode layer, which has its edge connected to the second external electrode as do the second internal electrode layers, is provided to only one of the plurality of second internal electrode layers so as to face one another via a third dielectric layer having a thickness smaller than the thickness of the first dielectric layer and not contributing to the formation of capacity; and
wherein the number of the first internal electrode layers including the at least one additional first internal electrode layer and the number of the second internal electrode layers including the at least one additional second internal electrode layer are each at least six.

2. A laminated capacitor according to claim 1, wherein the relationship of a thickness td1 of the first dielectric layer, a thickness td2 of the second dielectric layer, and a thickness td3 of the third dielectric layer satisfies $td2 \cong td3 < \frac{2}{3} \times td1$.

3. A laminated capacitor according to claim 1, wherein the laminated capacitor has a length L which is a measurement along the direction perpendicular to the laminated direction between the first and second external electrodes, a width W which is a measurement along the direction perpendicular to the laminated direction and also perpendicular to the length direction, and a height H which is a measurement along the laminated direction, wherein L>W>H.

4. A laminated capacitor according to claim 1, wherein the thickness of each second dielectric layer and the thickness of each third dielectric layer are as thick as about 40% to about 70% of the thickness of each first dielectric layer but are thicker than the thickness of each first and second internal electrodes.

5. A laminated capacitor according to claim 1, wherein the thickness of each second dielectric layer and the thickness of each third dielectric layer are about 0.5 μm to about 3.0 μm and the thickness of each first dielectric layer is about 2.0 μm to about 6.0 μm.

* * * * *